US007742971B2

(12) United States Patent
Sandholm et al.

(10) Patent No.: US 7,742,971 B2
(45) Date of Patent: Jun. 22, 2010

(54) PREFERENCE ELICITATION IN COMBINATORIAL AUCTIONS

(75) Inventors: Tuomas Sandholm, Pittsburgh, PA (US); Wolfram Conen, Velbert (DE)

(73) Assignee: CombineNet, Inc., Pittsburgh, PA (US)

( * ) Notice: Subject to any disclaimer, the term of this patent is extended or adjusted under 35 U.S.C. 154(b) by 1615 days.

(21) Appl. No.: 10/412,643

(22) Filed: Apr. 10, 2003

(65) Prior Publication Data

US 2004/0039682 A1 Feb. 26, 2004

Related U.S. Application Data

(60) Provisional application No. 60/371,436, filed on Apr. 10, 2002.

(51) Int. Cl.
*G06Q 99/00* (2006.01)
(52) U.S. Cl. ........................................ 705/37
(58) Field of Classification Search ............. 705/35–40
See application file for complete search history.

(56) References Cited

U.S. PATENT DOCUMENTS

| 6,704,716 B1 * | 3/2004 | Force .................. 705/80 |
| 6,718,312 B1 | 4/2004 | McAfee et al. |
| 7,133,841 B1 * | 11/2006 | Wurman et al. ............... 705/37 |

OTHER PUBLICATIONS

Tuomas Sandholm "Approaches to winner determination in combinatorial auctions" Decision Support Systems 28 (2000).*
Tuomas Sandholm "Algorithm for optimal winner determination in combinatorial auctions" Artificial Intelligence 135 (2002).*
Sushil Bikhchandani and Joseph M. Ostroy, "The Package Assignment Model", UCLA Working Paper Series, mimeo, 36 pp., (1998).
Wolfram Conen and Fredj Dridi Eckhart Köppen, "A Secure XML/Java-Based Implementation Of Auction Services For Complex Resource Allocation Problems", In IEEE, Proc. Of WETICE 2000, Nist, 7 pp., (2000).
Wolfram Conen, "Economic Coordination, Bundled Goods, and the Impact of Complementarities", In Parsons and Woolridge, editors, Workshop on Decision Theoretic and Game Theoretic Agents, London, 12 pp., (1999).
Sven de Vries and Rakesh Vohra, "Combinatorial Auctions: A Survey", 47 pp. (May 2000).
Rina Dechter and Judea Pearl, "Generalized Best-First Search Strategies and the Optimality of A", Journal of the Association of Computing Machinery, vol. 32, No. 3, pp. 505-536, (Jul. 1985).

(Continued)

*Primary Examiner*—Thu-Thao Havan
*Assistant Examiner*—Thomas M Hammond, III
(74) *Attorney, Agent, or Firm*—The Webb Law Firm

(57) ABSTRACT

In determining a winning allocation in a forward auction, reverse auction or an exchange, a plurality of allocations are defined wherein each allocation defines a trade between one or more potential buyers and one or more potential sellers. At least one potential buyer is queried regarding at least one preference of the buyer about at least one allocation or a bundle associated therewith. The buyer's reply or intimation to the query is received and, based on the reply or intimation, each allocation that is either not feasible or not optimal is eliminated from consideration as the winning allocation. This process is repeated until a predetermined criteria is met whereupon one of the remaining allocations is selected as the winning allocation.

30 Claims, 4 Drawing Sheets

OTHER PUBLICATIONS

Gabrielle Demange, David Gale and Marilda Sotomayor, "Multi-Item Auctions", Journal of Political Economy, vol. 94, No. 4, pp. 863-872, (1986).

Faruk Gul and Ennio Stacchetti, "Walrasian Equilibrium with Gross Substitutes", Journal of Economic Theory, 24 pp., (1999).

Alexander S. Kelso, Jr. and Vincent P. Crawford, "Job Matching, Coalition Formation, and Gross Substitutes", Econometrica, vol. 50, No. 6, pp. 1483-1504, (Nov. 1982).

Herman B. Leonard, "Elicitation of Honest Preferences for the Assignment of Individuals to Positions", Journal of Political Economy, vol. 91, No. 31, pp. 461-479, (1983).

Peter R. Wurman and Michael P. Wellman, "Equilibrium Prices in Bundle Auctions", Submitted for Publication, to Appear as Santa Fe Institute Working Paper, 14 pp. (1999).

Kate Larson and Tuomas Sandholm, "Computationally Limited Agents in Auctions", In Agents-01 Workshop of Agents for B2B, 8 pp., (2001).

Kate Larson and Tuomas Sandholm, "Costly Valuation Computation in Auctions", In Tark, Siena, Italy, 14 pp., (2001).

David C. Parkes, "iBundle: An Efficient Ascending Price Bundle Auction", In Proc. ACM Conference on Electronic Commerce, 10 pp. (Nov. 1999).

David C. Parkes, "Optimal Auction Design for Agents with Hard Valuation Problems", In Agent-Mediated Electronic Commerce Workshop at the IJCAI, 13 pp., (1999).

David C. Parkes and Lyle Ungar, "Iterative Combinatorial Auctions: Theory and Practice", American Association for Artificial Intelligence, 8 pp., (2000).

David C. Parkes and Lyle Ungar, "Preventing Strategic Manipulation in Iterative Auctions: Proxy Agents and Price-Adjustment", American Association for Artificial Intelligence, 8 pp., (2000).

Tuomas Sandholm, "An Implementation of the Contract Net Protocol Based on Marginal Cost Calculations", in AAAI, 7 pp., (1993).

William Vickrey, "Counterspeculation, Auctions, and Competitive Sealed Tenders", J Finance, 16: pp. 8-37, (1961).

CRC, Standard Mathematical Tables, Twenty-first Edition, The Chemical Rubber Company, 38 pp. (1973).

Peter R. Wurmand and Michael P. Wellman, "A$k$BA: A Progressive, Anonymous-Price Combinatorial Auction", EC'00, 9 pp., (2000).

* cited by examiner

= NOT FEASIBLE

|   | ∅ | A | B | AB |
|---|---|---|---|----|
| $a_1$ | 0 | 4 | 3 | 8 |
| $a_2$ | 0 | 1 | 6 | 9 |

PREFERENCE ELICITATION IN COMBINATORIAL AUCTIONS

CROSS REFERENCE TO RELATED APPLICATION

This application claims priority from U.S. Provisional Patent Application Ser. No. 60/371,436, filed Apr. 10, 2002, entitled "Minimal Preference Elicitation In Combinatorial Auctions".

BACKGROUND OF THE INVENTION

1. Field of the Invention

The present invention relates to auctions and, more particularly, to winner determination in forward auctions, reverse auctions and exchanges.

2. Description of Related Art

Combinatorial auctions where bidders can bid on bundles of items can be desirable market mechanisms when the items exhibit complementarily or substitutability, so the bidder's valuations for bundles are not additive. One of the problems with these otherwise desirable mechanisms is that determining the winners is computationally complex. There has been a recent surge of interest in winner determination algorithms for such markets.

Another problem, which has received less attention, is that combinatorial auctions require potentially every bundle to be bid on, and there are exponentially many bundles. This is complex because a bidder may need to invest considerable effort or computation into determining each valuation. It can also be undesirable from the perspective of revealing unnecessary private information and from the perspective of unnecessary communication.

It is, therefore, desirable to identify a topological structure that is inherent in combinatorial auctions that can be used to intelligently ask only relevant questions about the bidders' preferences while still finding the optimal (welfare-maximizing and/or Pareto-efficient) solution(s). It is also desirable to provide building blocks for a design of an auctioneer that interrogates each bidder intelligently regarding the bidder's preferences, and optimally assimilates the returned information in order to narrow down the set of potentially desirable allocations, and decide which questions to ask the bidders next to further narrow down the set of potentially desirable allocations.

SUMMARY OF THE INVENTION

The invention is a method of determining a winning allocation in a forward auction, reverse auction or an exchange that includes: (a) defining a plurality of allocations, wherein each allocation defines a trade between one or more potential buyers and one or more potential sellers; (b) querying at least one potential buyer regarding at least one preference of said buyer about at least one allocation or a bundle associated therewith; (c) receiving said buyer's reply or intimation to the query; (d) based on said reply or intimation, eliminating from consideration as a winning allocation each allocation that is at least one of (1) not feasible and (2) not optimal; and (e) based on a predetermined criteria, selecting one of the remaining allocations as the winning allocation.

The method can further include, before step (e), repeating steps (b-d) a plurality of times. For each repetition of step (b), a different buyer can be queried from the previous repetition of step of (b).

The reply in step (c) can be responsive to the query or unsolicited information regarding the at least one preference of the buyer. The intimation in step (c) can be the absence of a response by the buyer to the query.

The predetermined criteria can include: one remaining allocation; all remaining allocations are equally optimal; the remaining allocation's values are all within a measure of each other; and all remaining allocations have values that are within a predetermined range of values. The measure can include a bound or a factor.

The query can include at least one of: the bidder's desired price for a bundle; the bidder's desired ranking of a bundle; the bidder's desired order of at least two bundles in the sense the buyer prefers one bundle over another; the bidder's desired bundle when a hypothetical bid price is proposed for two or more bundles; the bidder's desired attribute(s) associated with a bundle or at least one item thereof; and how the bidder assimilates attribute(s) in the sense of how his utility is affected by the attribute values.

The attribute(s) can include at least one of at least one of credit history, shipping cost, bidder credit worthiness, bidder business location, bidder business size, bidder zip code, bidder reliability, bidder reputation, bidder timeliness, freight terms and conditions, insurance terms and conditions, bidder distance, bidder flexibility, size, color, weight, delivery date, width, height, purity, concentration, pH, brand, hue, intensity, saturation, shade, reflectance, origin, destination, volume, earliest pickup time, latest pickup time, earliest drop-off time, latest drop-off time, production facility, packaging and flexibility.

The bidders desired price can include one of an exact price, an upper bound and a lower bound.

The query can include the bidder being asked if a valuation for a bundle is an exact price and/or the bidder being asked to supply an exact price for the bundle. The query can also include the bidder being asked to supply a ranking of at least two bundles; the bidder being asked to supply a bundle that the bidder desires at a specific ranking; the bidder being asked to supply a desired ranking to a bundle X; and/or the bidder being asked to supply a next desired bundle after a bundle X.

Each bundle includes at least one item, a quantity of the one item and a price for the bundle.

The values of the bundles forming the winning allocation, absent the value of each bundle of one bidder, can be summed to obtain a first value. Another winning allocation can then be determined absent the one bidder. The values of the bundles in the other winning allocation can be summed to obtain a second value. A difference between the first and second values can be determined and said difference can be assigned as the value of each bundle of the one bidder in the winning allocation regardless of the price assigned to each bundle of the one bidder by the one bidder. The thus assigned difference is the value the one bidder pays or the value the one bidder receives for the bundle.

The query can elicit from the buyer information only known be the buyer.

The query can include the bidder being asked the effect on at least one offer if the allocations are restricted and/or the bidder being asked what restriction can be applied to the allocations to produce a specific change in at least one offer. The query can further include the bidder being asked how much of a discount will an offer receive for a minimum value commitment and/or the bidder being asked how much business will the bidder have to be given in order to get from the bidder a predetermined percentage discount.

Any one or more of the foregoing method steps can be embodied in instructions which are stored on computer readable medium. When these instructions are executed by a processor, the instructions can cause the processor to perform any one or combination of the foregoing method steps.

DETAILED DESCRIPTION OF THE INVENTION

Figure 1:
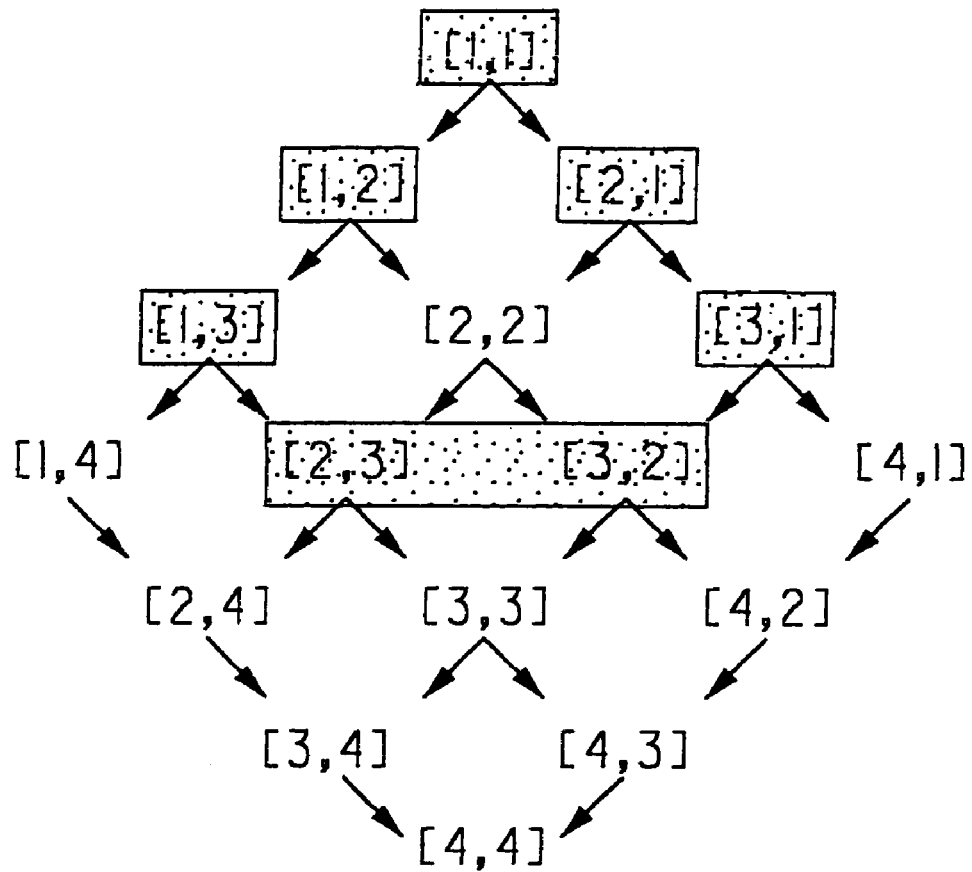
FIG. 1 is the rank lattice of the possible combination of bids of two bidders wherein infeasible allocations are illustrated on a highlighted background.
Figure 1:

The present invention will be described in connection with a combinatorial forward auction. However, this is not to be construed as limiting the invention since the present invention is also applicable to combinatorial reverse auctions and combinatorial exchanges.

The present invention will also be described with reference to the accompanying figures and to the following list of symbols and their meanings which are used herein to describe the invention. While most of the listed symbols are used consistently throughout the following detailed description, the meaning of some of the symbols may change depending upon the context in which they are used—which change in context would be apparent to one of ordinary skill in the art to which the invention pertains. Therefore, it is to be understood that each of the following listed symbols and their meanings are provided to facilitate an understanding of the invention and the manner and process of making and using the it, in such full clear, concise and exact terms to enable one skilled in the art to make and use the same and are not to be construed as limiting the invention.

| | |
|---|---|
| bundle = subset of items | $i$ = subset of I or bidder i |
| C = set of rank vectors | $j$ = bidder j |
| $C_{ab}$ = value domination | K = subset of vertices in augmented order graph G |
| c = node c (in rank lattice) | |
| edge(s) = arc(s) in G | k = node k |
| G = augmented order graph | l = node l |
| I = newly received information | m = number of items |
| N = set of bidders $\{1, \ldots, n\}$ | z = allocation or welfare maximizing allocation |
| n = node n, node in a rank lattice dominated by node c, or a number of bidders | $\Omega$ = set of indivisible, distinguishable items |
| $O_{ab}$ = order domination | $\omega_1, \omega_2 \ldots, \omega_m$ |
| R = rank vector or rank of a node | $\subseteq$ = is a subset of |
| r = rank vector | $\cup$ = union |
| s = start node | $\cap$ = intersection |
| r = successor bundles (from S) in the rank lattice | $\subset$ = is a proper subset of |
| | $\in$ = is an element of |
| = set of vertices in augmented order graph | $\notin$ = is not an element of |
| $v_i$ = value bidder i is willing to pay for a given bundle | $\exists$ = there exists |
| | $\forall$ = for every |
| $v_j$ = value bidder j is willing to pay for a given bundle | > = domination arc (indicates that one bid dominates another bid) |
| x = bundle | |
| x = bundle x | \ = does not include |

-continued

| | |
|---|---|
| $x_i$ = bundle of a bundle | s.t. or : = such that |
| Y = input set of rank vectors | \| \| = absolute value |
| $Y_i$ = bundle of i | |
| y = bundle y | |

In a combinatorial auction, a seller has a set $\Omega = \{\omega_1, \ldots, \omega_m\}$ of indivisible, distinguishable items for sale. Any subset of the items is called a bundle. The set of bidders (buyers) is called $N = \{1, \ldots, n\}$.

Herein, it is assumed that the seller has zero reservation prices on all bundles, i.e., the seller gets no value from keeping them. If in reality the seller has reservation prices on bundles, that can be modeled by treating the seller as one of the bidders who submits bids that correspond to the reservation values. Each bidder has a value $v_i$ that the bidder is willing to pay for any given bundle. It is assumed that the valuations v are unique ($v_i(X) \neq v_j(Y)$ if $i \neq j$ or $X \neq Y$). This an innocuous assumption since if the valuations are drawn from real numbers the probability of a tie is zero.

In accordance with the present invention, the auctioneer can ask any bidder i questions about the bidder's valuation $v_i$, and it is assumed that the bidder answers each question truthfully.

Initially, a standard quasilinearity assumption about the bidder's utilities is made. Namely, the utility u of any bidder i for a bundle $A \subseteq \Omega$ is $u_i(A, p) = u_i(A) - p$, where p is the amount that the bidder has to pay.

A collection $(X_1, \ldots, X_n)$ states which bundle $X_i \subseteq \Omega$ each bidder i receives. In a collection, some bidders' bundles may overlap in items, which would make the collection infeasible. A collection is called an allocation if it is feasible, i.e., each item, or each unit of an item having multiple units in the auction, is allocated to at most one bidder. The possibility that $X_i = 0$ is allowed.

An allocation X is welfare maximizing if it maximizes $$\sum_{i=1}^{n} v_i(X_i)$$

among all allocations (feasible collections). An allocation X is Pareto efficient if there is no other allocation Y such that $v_i(X_i) \geq v_i(Y_i)$ for each bidder i and strictly for at least some bidder i. As used herein, Pareto efficiency is based on comparison of bundles within an agent, or bidder. If payments are taken into account in the definition of Pareto efficiency, then the set of Pareto-efficient solutions collapses to equal the set of welfare-maximizing solutions.

Topological Structure in Combinatorial Auctions

There is significant topological structure in the combinatorial auction setting. This topological structure is utilized hereinafter to avoid asking the bidders unnecessary questions about their valuations.

Rank Lattice and Associated Algorithms

Figure 2:
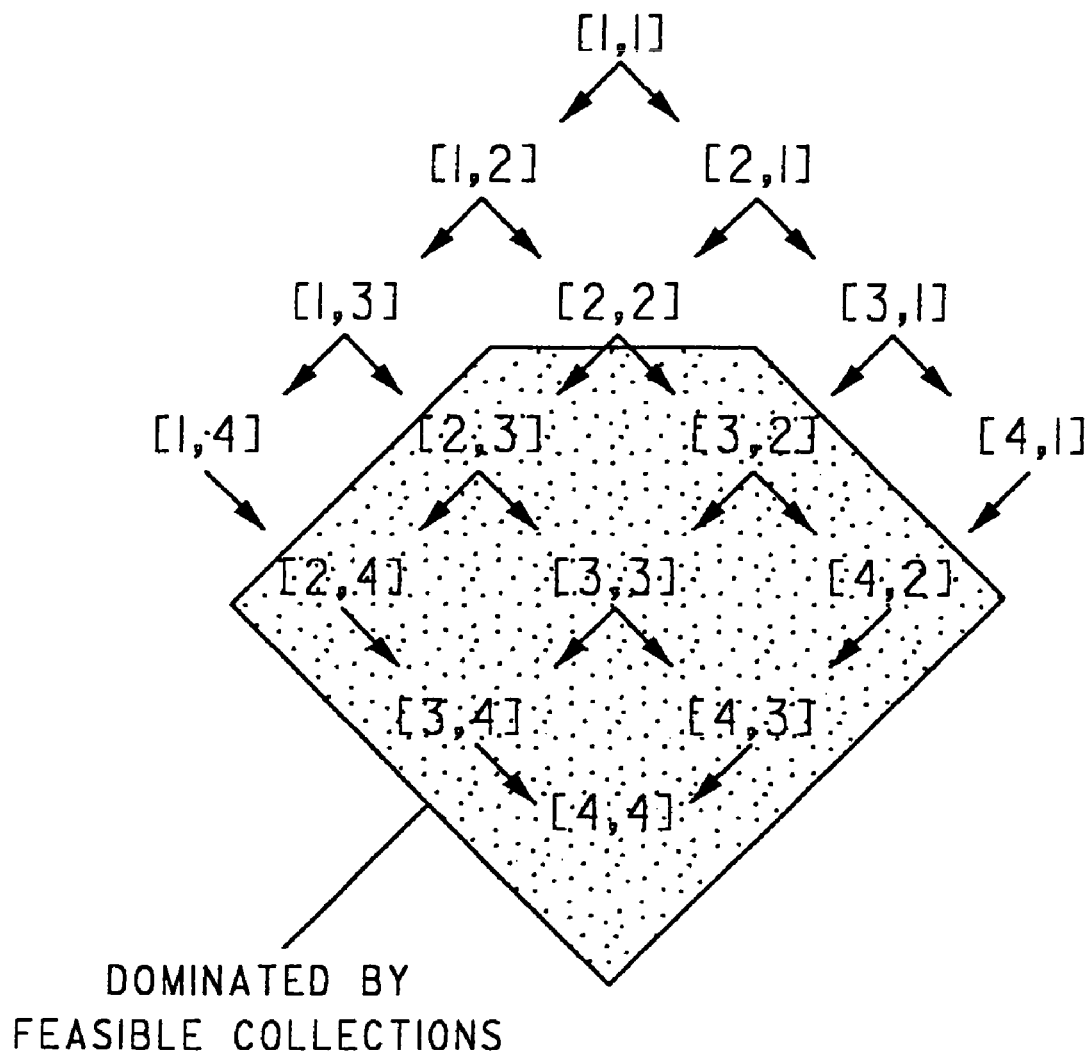
FIG. 2 is the rank lattice of FIG. 1 with bids that are dominated by feasible collections shown on a highlighted background.

With reference to FIGS. 1 and 2, conceptually, bundles can be ranked for each agent, or bidder, from most preferred to least preferred. This gives a unique rank for each bundle for each agent, or bidder. Without reference to the values of the bundles, each collection can be mapped to a unique rank vector $[R_1(X_1), R_2(X_2), \ldots, R_n(X_n)]$. The set of rank vectors, and a "dominates" relation between them define a rank lattice of the type shown in FIG. 1. A "dominates" relation is defined as: given two rank vectors a and b, a dominates b iff $a_i \geq b_i$ for all bidders i and $a_j > b_j$ for at least one bidder j. If a collection (resp. its rank vector) is feasible (i.e., is an allocation), then no collection (resp. its rank vector) "below" it in the rank vector can be a better solution to the allocation problem.

For example, suppose there are two goods, A and B, and two agents, or bidders, $a_1$ and $a_2$. The agents, or bidders, rank the bundles as follows:

Agent (bidder) $a_1$: (1:AB, 2:A, 3:B, 4:0)
Agent (bidder) $a_2$: (1:AB, 2:B, 3:A, 4:0)

This implies the rank lattice of FIG. 1. Only the subset of the collections not highlighted in FIG. 1 is feasible and, thus, correspond to allocations. In the rank lattice of FIG. 1, the nodes are collections. Some of the collections are dominated, as shown in highlight FIG. 2, some are infeasible, as shown in highlight in FIG. 1, some are both, e.g., collections [2, 3] and [3, 2] and some are neither, i.e., collections [1, 4], [2, 2] and [4, 1].

Figures 3, 4:
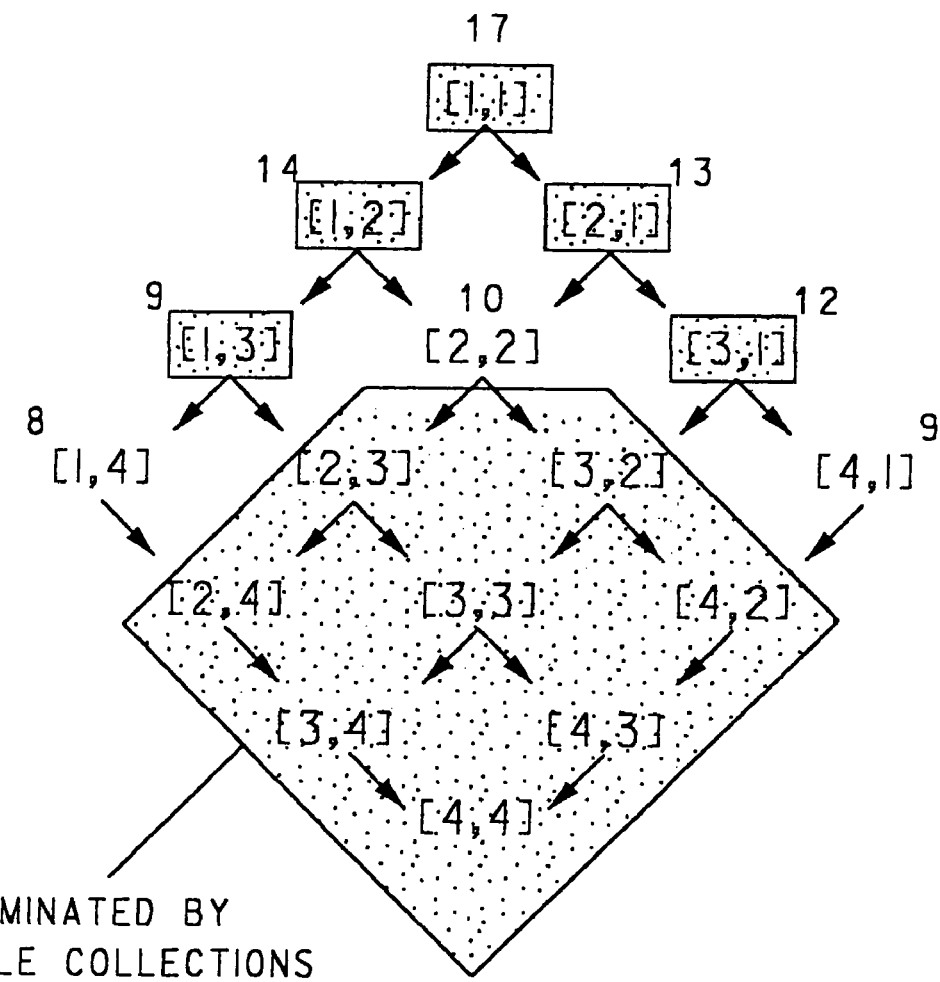
FIG. 3 is a spread-sheet showing bid prices bid by each bidder in connection with the various bids of the rank lattice shown in FIGS. 1 and 2.
FIG. 4 is an overlay combination of the rank lattices shown in FIGS. 1 and 2 including for some of the combination of bids of bidders 1 and 2 the sum of the bid values.

If a feasible collection is not dominated by another feasible collection, it belongs to the set of Pareto-efficient solutions. As shown in FIG. 4, by overlaying the rank lattices of FIGS. 1 and 2, it can be seen that the set of Pareto-efficient solutions is [2, 2], [1, 4], [4, 1].

The following Algorithm 1, that operates top-down, breadth-first along the implicitly given structure of the rank lattice, can be used to compute the set of Pareto-efficient allocations.

---

(Algorithm 1): s = (1, . . ., 1) /* start node */
  PAR = [] /* List of Pareto-optimal nodes */
  OPEN = [s] /* List of unexpanded nodes */
  while OPEN ≠ [] do
    Remove(c, OPEN)
    SUC = suc(c)
    if Feasible (c) then
      PAR = PAR ∪ {c}
      Remove(SUC, OPEN)
    else for each n ∈ SUC do
      if n ∉ OPEN and Undominated (n, PAR)
      then Append(n, OPEN)

---

For computational purposes, successor function suc(c) can be implemented by deriving from a node c its set of successors $(r_1, \ldots, r_n)$ as follows. For each i, $1 \leq i \leq n$ with $r_i < 2^m$, generate $s_i \in suc(c)$ as s $(r_1, \ldots, r_i+1, \ldots, r_n)$.

In each cycle of step Remove(c, OPEN) in Algorithm 1, at least one node is removed from the list of open nodes. No node will be appended twice to the list of open nodes. To see this, note that the rank lattice is explored level-wise, that is, nodes of a level n+1 are only added, while nodes of the level n are explored. This ensures that a node that is removed from the head of the list OPEN will not be added again. Nodes that are removed because they have a feasible parent node will not be added again, because a node is only appended to the list OPEN if it is neither contained in the list OPEN nor if it is dominated by a node in the list PAR. A node that has been removed is dominated by a node in the list PAR, and no other collection will ever be added to the list PAR.

With the assumed finiteness of the preference orders, termination follows.

Furthermore, every rank vector representing an infeasible collection of bundles that is not dominated by a rank vector which represents an allocation, will be expanded. Thus, assuming the correctness of the feasibility check, every feasible collection (allocation) that is not dominated by another feasible collection (allocation) will be found and added to the list PAR.

If (monetary) valuations of preferences are available, the rank lattice can be utilized to guide the search for a welfare-maximizing solution. For example, let there be the two goods, A and B, and the two agents, or bidders, $a_1$, and $a_2$ of the above example wherein the agents, or bidders, assign values to the bundles as shown in FIG. 3. The values shown in FIG. 3 imply the preference order previously considered. The value-augmented rank lattice is shown in FIG. 4. The welfare-maximizing allocation is given by rank vector [2, 2], that is $X^* = \{A, B\}$.

The following Algorithm 2 uses rank and value information to determine a welfare-maximizing allocation.

---

(Algorithm 2): s = (1, . . ., 1) /* start node */
  OPEN = {s}; /* List of unexpanded nodes */
  CLOSED = 0; /* List of expanded nodes */
  while OPEN = 0 do
    c = arg $mac_{c \in OPEN} \Sigma_{i \in N} v_i(c_i)$
    OPEN = OPEN \ {c}
    if Feasible(c) then return {c}
    CLOSED = CLOSED ∪ {c}
    SUC = suc(c)
    for each n ∈ SUC do
      if n ∉ OPEN and n ∉ CLOSED
      then OPEN = OPEN ∪ {n}

---

In practice, Algorithm 2 prompts the auctioneer to ask one or more agents, or bidders, questions to determine the best rank vector in the list OPEN (i.e., to solve arg max). In response to receiving the rank information, the auctioneer would input this information into Algorithm 2 for processing. More specifically, Algorithm 2 traverses the rank lattice in a way that leads to a natural sequence of questions for the auctioneer to ask the one or more bidders, e.g., asking for each bidder their highest ranking bundle first, then proceeding to the next best bundle and so on.

Additionally or alternatively, the auctioneer can ask each bidder the following question which is more natural than an unconstrained rank question: "if you cannot get any one of the bundles that you have named desirable so far, what is your next preferred bundle?"

Algorithms 1 and 2 are based on a search, with the search strategy imposing constraints on the order in which questions are asked. Hereinafter disclosed is an additional data structure that can be used to avoid this problem. Questions can be asked in any order that the auctioneer considers (ex ante) most efficient, and no unnecessary (from the perspective of all the information known and derivable at that time) questions are asked.

Augmented Order Graph

Figure 5:
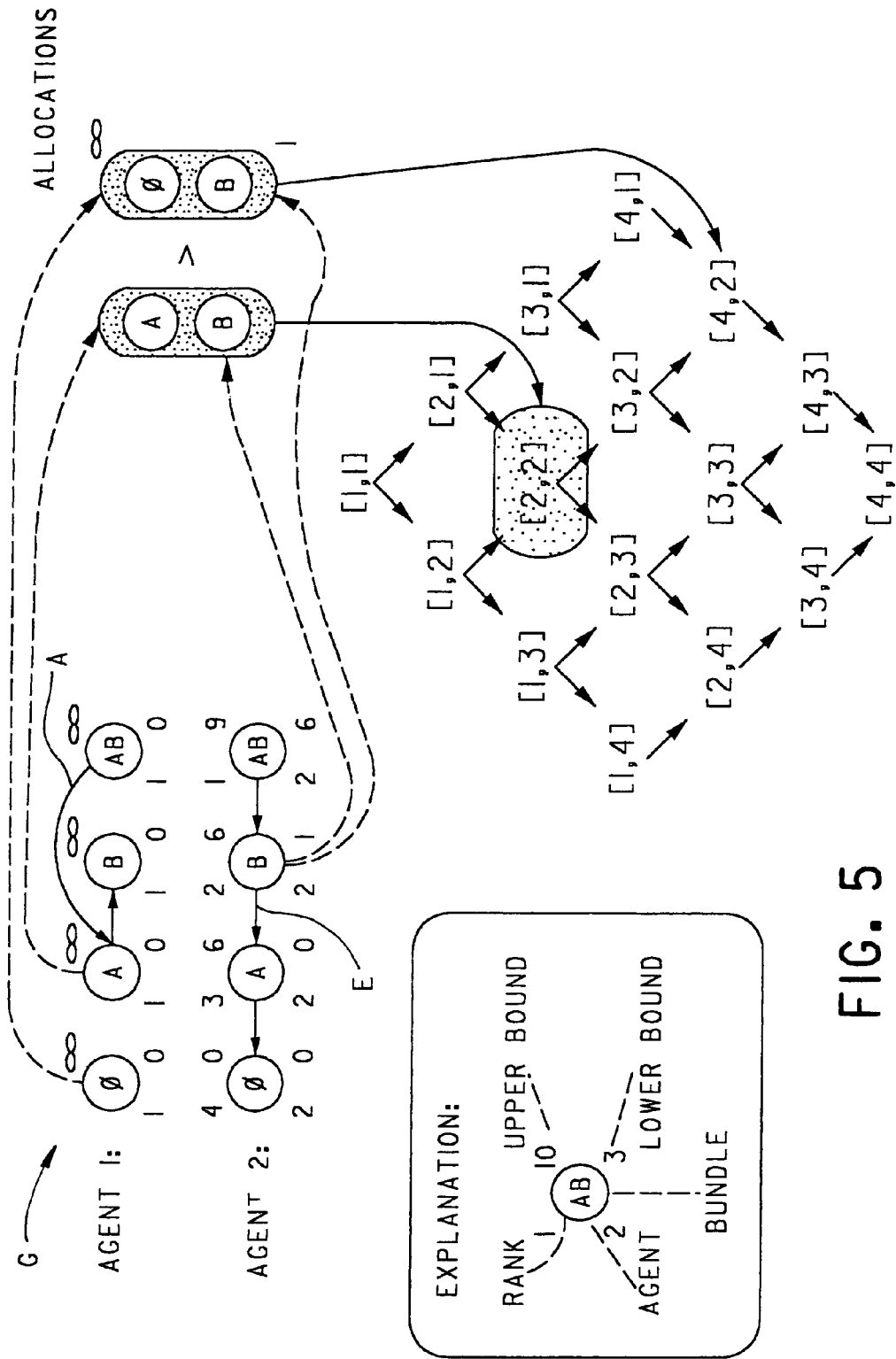
FIG. 5 is an augmented order graph that includes a node for each bidder—bundle pair and which further includes the rank lattice of FIG. 1.

With reference to FIG. 5, an augmented order graph G of the goods, or items, and agents, or bidders, shown in Example 1 includes a node for each (bidder, bundle) pair (i, X). It includes a directed arc, e.g., arc A, from node (i, X) to node (i, Y) of the same bidder whenever $v_i(X) > v_i(Y)$. These arcs are called domination arcs >. Graph G also includes an upper bound value UB and a lower bound value LB for each node. Finally, it includes a rank $R_i(X)$ for every node. Because there may be nodes of bidder i that are not joined with an arc, and rank values may be missing, some of these variables may not have values.

Initially, graph G includes no edges. Upper bounds UBs are initialized to ∞, or a very large number, and lower bounds LBs are initialized to 0 in the free-disposal case or to −∞, or a very large negative number, in the general case. All of the rank information is initially missing. If there is free disposal, edges, e.g., edge E, are added to graph G to represent the absence of rank information when $((i, X), (i, Y)) \in \geq$ iff $Y \subset X$ and $X \neq Y$.

The augmented order graph G of FIG. 5 shows the 2-agent, or bidder, 2-good example discussed above at a stage where some of the information from the bidders has not yet been asked or elicited. In the upper right corner of FIG. 5, two allocations and their relation to the nodes in graph G are shown. These allocations are connected to the corresponding feasible allocations in the rank lattice. The lower bound value LB of an allocation is the sum of the lower bound values of the bundles in that allocation. Similarly, the upper bound value UB of an allocation is the sum of the upper bound values of the bundles in that allocation. In FIG. 5, the allocations can be ordered due to previously obtained available rank information. As shown in the upper right hand corner of FIG. 5, allocation $(\{A\}, \{B\})$ dominates allocation $(\{0\}, \{B\})$. The rank vector highlighted in FIG. 5 represents the welfare-maximizing allocation. This, however, cannot be determined yet due to lack of information.

In accordance with the present invention, augmented order graph G can be utilized as a basic analysis tool. As new information is obtained, it is incorporated into augmented order graph G. This may cause new arcs or edges to be added, bounds to be updated, or rank information to be filled in. As a piece of information is obtained and incorporated, its implications are fully propagated, as will be discussed hereinafter. The process is monotonic in that new information allows us to make more specific inferences. Edges are never removed, upper bounds UBs never increase, lower bounds LBs never decrease, and rank information is never erased.

Policy-Independent Algorithms for Selecting Allocations

Next, algorithms, or sets of rules for solving problems, are disclosed that find desirable allocations based on asking the bidders questions. The idea is to use the algorithms as a means for guiding an auctioneer to intelligently ask bidders appropriate questions for determining good allocations without asking unnecessary questions. Each of the algorithms is incremental in that it requests information, propagates the implications of the answer, and does this again until it has received enough information. For example, the auctioneer may be able to ask any bidder i any of the following questions:

| | |
|---|---|
| Order information: | Which bundle do you prefer, A or B? |
| Value information: | What is your valuation for bundle A? (The bidder can answer with bounds or an exact value). |
| Rank information: | In your preferences, what is the rank of bundle A? Which bundle has rank x in your preferences? (Hereinafter discussed is the more natural question: If you cannot get the bundles that you have declared most desirable so far, what is your most desired bundle among the remaining ones?) |

In different settings, answering some of these questions might be more natural and easier than answering others. Therefore, different algorithms are disclosed that use only some of these types of questions. In the following description, mnemonic subscripts r, v and o refer to rank information, value information and order information, respectively.

General Structure and Common Routines

All of the policy-independent algorithms discussed hereinafter utilize the same general structure. Namely, augmented order graph G and an input set of rank vectors Y are expected as input to the algorithms. For some algorithms, the input set of rank vectors Y will include only feasible rank vectors, which represent allocations. For other algorithms infeasible rank vectors will also be considered.

A general, or generic, algorithm is shown in the following Algorithm 3:

(Algorithm 3): Solve(Y, G):
```
while not Done (Y, G) do /* Algorithm Done is described hereinafter/
    o = SelectOp(y, G) /* Choose question */
    I = Perform Op(o, N) /* Ask a bidder the question */
    G = Propagate (I, G) /* Update graph G */
    U = Candidates (Y,G) /* Curtail the set of candidate allocations */
```

In addition to Algorithm 3 the following Algorithms 4-10 to compare two collections and to propagate value information, rank information and order information in augmented order graph G.

Given two collections, a and b, and augmented order graph G, the following Algorithm 4 can be used to check whether a dominates b. This is determined using a combination of value and order information (queried and inferred). Algorithm 4, i.e., the Dominates procedure, does not explicitly use rank information because the implications of the rank information will have already been propagated into the value information in the bounds and the order information.

(Algorithm 4): Dominates(a, b, G):
```
O_{ab} = FALSE /* Flag for order domination */
C_{ab} = 0 /* Amount of value domination */
for each i ∈ N do
    if LB_i^a > UB_i^b
        then C_{ab} = C_{ab} + (LB_i^a - UB_i^b)
    else if a_i > bi
        then O_{ab} = TRUE
        else C_{ab} = C_{ab} + (LB_i^a - UB_i^b)
if C_{ab} > 0 or (C_{ab} = 0 and 0_{ab} = TRUE)
    then return TRUE else return FALSE.
```

If augmented order graph G is consistent, that is, order and value information are not contradictory, Algorithm 4 returns TRUE if and only if (iff) enough information has been queried to determine that a dominates b. Otherwise, FALSE is returned.

Next, the propagation of newly received information is disclosed. If value or order information is inserted into a previously consistent graph G, values of upper bounds UBs are propagated in the direction of the edges and lower bounds LBs in the opposite direction. This propagation is done via a depth-first-search (that marks the nodes touched when they are visited) in graph G, so the propagation time is O(v+e), where v is the number of bundles, i.e., the number of nodes in G that correspond to the agent, or bidder, whose values are getting updated, and e is the number of edges between those nodes. The insertion of rank information is performed as a sequence of insertions of new edges that reflect the derivable order information.

When searching augmented order graph G, the following algorithms can be utilized at a node k for inserting a new lower bound LB (Algorithm 5) inserting a new upper bound UB (Algorithm 6), inserting a new edge k>l (Algorithm 7), inserting an exact valuation for node k (Algorithm 8) and inserting a rank for node k (Algorithm 9).

```
(Algorithm 5):   PropLB (k, G) /* graph G contains the set of edges > */
                 Pre = {l : (l, k) ∈ > }
                 for each l ∈ Pre do
                     if LB_k > LB_l then LB_l = LB_k and PropLB(l, G)
(Algorithm 6):   PropUB(k, G)
                 Suc = {l: (k, l) ∈ > }
                 for each l ∈ Suc do
                     if UB_k < UB_l then UB_l = UB_k and PropUB (l, G)
(Algorithm 7):   InsertEdge((k, l), G)
                 if LB_k < LB_l then LB_k = LB_l and PropLB (k, G)
                 if UB_k < UB_l then UB_l = UB_k andPropUB (l, G).
(Algorithm 8):   Insert Value((k, v), G)
                 LB_k = v
                 PropLB(k, G)
                 UB_k = v
                 PropUB(k, G).
(Algorithm 9):   InsertRank((n, r), G)
                 (i, b) = n and K = {j, c) ∈ V: j = i}
                 if ∃k ∈ K with R_k < R_n and
                     R_k ≥ R_l ∀l ∈ K with R_l < R_n
                     then InsertEdge ((k, n), G)
                 if ∃k ∈ K with R_k > R_n and
                     R_k ≤ R_l ∀l ∈ K with R_l > R_n
                     then InsertEdge ((n, k), G).
```

Given a set of newly received information, I, and augmented order graph G, the following Algorithm 10 will insert information I and propagate it.

```
(Algorithm 10):  Propagate(I, G):
                 for each i ∈ I do
                     switch i /* Structural switch */
                         (node k, LB b):
                             if LB_k < b then LB_k = b; (Call Algorithm 5) PropLB(k, G)
                         (node k, UB b):
                             if UB_k > b then UB_k = b; (Call Algorithm 6) PropUB(k, G)
                         (node k, node l): (Call Algorithm 7) InsertEdge((k, l), G)
                         (node k, value v): (Call Algorithm 8) Insert Value((k, v), G)
                         (node k, rank r): (Call Algorithm 9) InsertRank((k, r), G)
```

As can be seen, based on the general structure of Algorithm 3, policy-independent algorithms, e.g., Algorithms 5-9, can be derived that differ on the types of information that they request from the bidders. To complete Algorithm 3, the procedures embodied in Algorithms 5-9 have to be plugged into Algorithm 3.

Algorithms that Query Value Information

Next, the querying of value information will be described. More specifically, the following Algorithms 11 and 12 are plugged into Algorithm 3 to determine the set of welfare-maximizing solutions.

Given a non-empty set of feasible allocations Y, and augmented order graph G, the following Algorithm 11 checks whether all the allocations in the set of feasible allocations Y have the same value.

```
(Algorithm 11):  Done_v(Y, G):
                 if |Y| = 1 then return TRUE
                 for each a ∈ Y do
                     lb = Σ_{n∈G_a} LB_n
                     ub = Σ_{n∈G_a} UB_n
                     if lb ≠ ub then return FALSE
                 return TRUE.
```

Algorithm 11 returns TRUE if and only if all allocations in Y have the same value.

The following Algorithm 12 determines from a set of feasible allocations Y a subset a that contains all allocations that are not known to be dominated, given the information available in graph G. The resulting set will only contain allocations that are pairwise incomparable with respect to Algorithm 4. More specifically, Algorithm 12 determines the (maximal) set O of allocations such that for each allocation a in O there does not exist an allocation b in the input set Y which dominates a.

```
(Algorithm 12):  Candidates_v(Y, G):
                 O = 0; C = 0
                 while Y ≠ 0 do
                     pick a ∈ Y /* arbitrarily selects an element */
                     Y = Y \{a}; C = 0
                     while Y ≠ 0 do
                         pick b ∈ Y; Y = Y\{b}
                         if Algorithm 4: Dominates(b, a ,G)
                                    /* if Dominates returns TRUE */
                             then a = b
                         else if not Algorithm 4: Dominates(a ,b, G)
                                    */ if Dominates returns FALSE */
```

-continued

```
                         then C = C ∪ {b}
                     y = C; O = O ∪ {a}
                 return O.
```

Next, in connection with the querying of value information utilizing Algorithm 3, an interrogation policy to instantiate SelectOp in Algorithm 3 is described.

With the observation that a completely augmented order graph, i.e., an order graph where, for any agent, or bidder, i and any bundle b, $LB_{(i,b)}=UB_{(i,b)}$, precisely decides all dominates relationship (and with the assumption that the information space is finite), any interrogation technique that continuously adds new information to graph G (up to its completion) can be used. However, this does not imply that the graph G must always be completely augmented to determine the solution set.

For example, select a node $\alpha=(i, b)$, where i=agent and b=node, from the set of not completely augmented nodes in graph G (that is, $LB_\alpha \neq GB_\alpha$) such that node $\alpha$ is among the nodes in this set with the largest number of relations to allocations in the set of feasible allocation Y. This selection criteria, however, is not to be construed as limiting the invention. Then, ask agent, or bidder, i for the value of bundle b.

Thus, precise valuations are requested directly thereby avoiding the need to use a less direct questions to obtain updated bounds (for example, with questions that ask for incremental (competitive) bidding). Nevertheless, the bidder's response adds new information to graph G in each round until graph G is completely augmented, which is a sufficient requirement for the correctness of Algorithm 12.

Given a set of feasible allocations Y and graph G, the appropriately instantiated Algorithm 3 will determine the set of undominated allocations contained in the set of feasible allocations Y. If the set of feasible allocations Y is initialized to the set of all feasible allocations, the result will be the set of welfare-maximizing allocations.

If the set of welfare-maximizing allocations contains more than one element, all valuations of nodes that are part of those allocations have to be known, i.e., Algorithm 11 will not terminate early. It has been observed that Algorithm 11 cannot be written more intelligently to avoid not terminating early because Algorithm 4 is best for evaluating the available information, and, after the first round, each set of feasible allocations Y only contains allocations that are pairwise incomparable with respect to Algorithm 4. Therefore, upon executing Algorithm 11, it is known that pairwise incomparability is either due to missing information or because the allocations have the same value, but only the latter is a correct reason to terminate. Thus, as long as it is not known whether the allocations in the set of feasible allocation Y have the same value, additional information has to be requested. The querying of this additional information will not be described.

Algorithms that Query Order Information

Next, the querying of order information will be described. Order information allows Pareto-efficient allocations to be determined, but cannot be used to determine welfare-maximizing allocations because that would require quantitative tradeoffs across bidders. The required algorithms to be used in Algorithm 3 to determine welfare-maximizing allocations will now be described.

Given a non-empty set feasible allocations Y and graph G, Algorithm 12 can be used in Algorithm 3 to determine the set of allocations that are not dominated, given the information in hand.

Given a set of allocations U and graph G, the following Algorithm 13 will return FALSE if a pair of allocations exists in U which have been judged incomparable due to lack of information, e.g., if it cannot be determined that a dominates b or vice versa.

---

(Algorithm 13): $Done_o(U, G)$
    for each $\{a, b\} \in U \times U$ $a \neq b$ do
        if not Definitely Incomparable (a, b)
            then if $\exists i \in N : ((i, a_i), (i, b_i)), \not\succ$
                and $((i, b_i), (i, a_i)) \not\succ$
            then return FALSE
    return TRUE.

---

A pair $\{a, b\}$ of allocations are Definitely Incomparable, if and only if there is a pair of, $\{i_1, i_2\}$ such that edges $(i_1, a_{i_1}) \succ (i_1, b_{i_1})$ and $(i_2, b_{i_2}) \succ (i_2, a_{i_2})$ and no edges $(i_1, b_{i_1}) \succ (i_1, a_{i_1})$ or $(i_2, a_{i_2}) \succ (i_2, b_{i_2})$ exist.

Next, in connection with querying or order information utilizing Algorithm 3, an interrogation policy to instantiate Select $Op_o$ in Algorithm 3 is described. The present invention can accommodate any interrogation policy here, but the following two exemplary interrogation policies are disclosed herein for Select $Op_o$ ($C_i$, G) in Algorithm 3 for the purpose of illustration. (1) Arbitrarily pick a pair of distinct allocations $\{a, b\}$ that are incomparable due to a lack of information. Arbitrarily, choose one of the bidders $i \in N$, for which no order, or rank information, for corresponding bundles $a_i$ and $b_i$ is available. Ask bidder i which bundle $a_i$ or $b_i$ is preferred. The answer to this question alone might not be sufficient to order a and b since there may be other unordered bundles in those allocations. Also, this question might not be necessary: it can be possible to deduce the answer from answers to other alternative questions. However, the answer to this question may make asking some other questions unnecessary. (2) Determine the set of pairs of incomparable allocations, U. While doing so, determine a set P of pairs of unordered nodes $\{(i, a_i), (i, b_i)\} \in$ graph G for which $\exists a, b \in U$, $a \neq b$ so that neither $((i, a_i), (i, b_i)) \in \succ$ nor $((i, b_i), (i, a_i)) \in \succ$. Next, select from P a pair $p = \{(i, b_1), (i, b_2)\}$ of nodes so that the number of pairs in U which contain p is maximal. Deciding this edge adds information to the largest number of decisions in the next stage. Then, ask the bidder which bundle is preferred more, $b_1$ or $b_2$.

Given the set of allocations Y, and graph G, for either of the foregoing interrogation policies, executing Algorithm 3 will determine the set of Pareto-efficient allocations contained in Y.

Algorithms that Query Value and Order Information

Next, a method of querying value and order information will be described.

Algorithms 11-13 described above for dealing with value information and for dealing with order information can be integrated to deal with both value and order information together. This is because the Algorithms 11-13 use value and order information to the fullest. The order edges from graph G, and the value information, are used to determine which allocations are still undominated. Also, the order information is used to propagate upper bound UB and lower bound LB information across nodes in graph G.

If Algorithm 11 allows early termination, the set of welfare-maximizing allocations has been found. If Algorithm 13 allows early termination, only the Pareto-optimal allocations have been determined so far.

Any query will suffice as long as it asks a bidder order questions about the bidders unordered bundles (that are included in currently undominated allocations), or value questions about bundles for which the upper and lower bounds differ. Based on the bidders response to the query, the welfare-maximizing allocations can be found. This generally does not even require knowing the value of those allocations since order information can substitute for detailed value information.

Algorithms that Query Rank Information

Allocations that use rank information only cannot determine welfare-maximizing solutions because that requires quantitative tradeoffs across agents, or bidders. However, Pareto-efficient solutions can be determined from rank information as follows.

Given graph G and a set of rank vectors C, the following Algorithm 14 answers TRUE if all elements of the set of rank vectors C are feasible.

---

(Algorithm 14): Done$_r$(C, G)
    for each c ∈ C do
        if ∃i ∈ N : ∄(i, b) ∈ V with R$_{(i,b)}$ = c$_i$
            then return FALSE /* Information missing */
        if not Feasible(c, G)
            then return FALSE else return TRUE.

---

Rank vector c is feasible if $b^c$, the corresponding set of bundles, is a partition of a subset of Ω. If some of the bundles related to ranks are not known yet, FALSE is returned.

---

(Algorithm 15): Candidates$_r$ (C, G):
    for each c ∈ C do
        if Infeasible(c, G)
            then C = the solution of Algorithm 16: Expand
            (c, C, G).

---

Infeasibility can often be determined without knowing all rank-bundle relations. If the partial information available is not sufficient to decide infeasibility, Algorithm will return FALSE. Thus, if Algorithms 14 and 15 return FALSE, the information is insufficient.

---

(Algorithm 16): Expand (c, C, G) /* Loops over successive rank
            vectors */
            S = suc (c)
            C = C \ {c}
            for each s ∈ S do
                if not call Algorithm 17: IsDominated (s, C, G)
                      then C= C ∪ {s}.
(Algorithm 17): IsDominated(s, C, G): for each c ∈ C do
            if c ≦ s
                then if not Infeasible (c, G) return TRUE
            return FALSE.

---

Next, in connection with the querying of rank information utilizing Algorithm 3, an interrogation policy to instantiate Select OP$_r$ in Algorithm 3 is described. The present invention can accommodate any policy, but two exemplary interrogation policies are disclosed herein for SelectOp$_r$(C, G) in Algorithm 3 for the purpose of illustration: (1) Select from the set of rank vectors C a rank vector c with the least number of ranks without related nodes in G. For each such rank r at position i of c, ask bidder i which bundle is at rank r. (2) Same as (1), but pick only one rank without a related node from c.

Given a set of rank vectors C and graph G, for both interrogation policies, Algorithm 3 can be utilized to determine the set of feasible rank vectors in the (partial) lattice determined by the set of rank vectors C that are either in the set of rank vectors C or dominated only by infeasible rank vectors in the set of rank vectors C. If the set of rank vectors C is initialized to (1, . . . , 1) the resulting set represents the set of Pareto-efficient allocations.

Algorithms that Query Rank and Value Information

Next, the querying of rank and value information and how such information can be used to determine welfare-maximizing solutions will be described.

Initially, the following Algorithms 18 and 19 are instantiated as follows.

---

(Algorithm 18): Candidates$_{rv}$ (C, G):
    c = arg max$_{d∈C}$ LB(d, G)
    if ∄d ∈ C \ {c} with UB(d, G) > LB (c, G)
        then C = Expand (c, C, G)

---

The following Algorithm 19 checks whether the node in the set of rank vectors C with the greatest lower bound might be dominated by an as yet incomparable and potentially feasible rank vector. If so, FALSE is returned.

---

(Algorithm 19):     Done$_{rv}$ (C, G)
                c = arg max$_{d∈C}$ LB(d, G) /* Best valued node */
                if ∃d ∈ C \ {c} with UB(d, G) > LB(c, G) and
                    not Infeasible(d, G)
                  then return FALSE else return TRUE

---

The following interrogation policy is disclosed herein for SelectOp$_{rv}$(C,G) in Algorithm 3 for the purpose of illustration. Pick the rank vector with the highest lower bound, e.g., c (c has some chance of being among the welfare-maximizing allocations). Pick from the remaining rank vectors a rank vector d with UB$_d$>LB$_c$ (d might end up being better than c once enough information is available to decide the dominates relation between c and d).

Next, if there is a rank r in position i in d without a related node (that is, neither the bundle that is ranked by agent, or bidder, i at rank r nor its valuation are known), ask bidder i which bundle is ranked at rank r (this will help to determine the feasibility of the rank vector d). If no such position i with missing bundle information exists, look for a position with no precise valuation information, that is, if there is a rank r in a position i of d and a corresponding node (i, b) with UB(i, b)≠LB(i, b), ask bidder, i the value for bundle b (this helps to improve the accuracy of the bounds on the overall valuation of d). Such a position i will always exist because otherwise the valuation for d would be precisely known already (UB$_d$=LB$_d$), and, with UB$_d$>LB$_c$, LB$_d$ would be greater than LB$_c$, which contradicts the selection of c.

Given a set of rank vectors, C, and graph G, Algorithm 3 can be utilized to determine the set of feasible rank vectors in the (partial) lattice determined by C that are not dominated by other feasible rank vectors in the sublattice. If C is initialized to (1, . . . , 1), the resulting set represents the welfare-maximizing allocations.

Incentive Compatibility (Inducing Truthful Bidding)

The elicitation of bidders preferences regarding their bids, with and without one or more of the foregoing algorithms to guide such elicitation, can be utilized with an incentive compatible auction mechanisms such as the generalized Vickrey auction (GVA). The idea is that the disclosed elicitation method would find a welfare-maximizing solution, but would ask extra questions to be able to find the welfare-maximizing solution under the assumption that each bidder in turn were not participating in the auction. The answers would suffice to compute the Vickrey payments, which would motivate the bidders to bid truthfully. The algorithms discussed above can be used for this purpose by simply ignoring every bidder's bids in turn and asking the ensuing questions for determining the welfare maximizing allocation. If there are lazy bidders that would not participate once their bundles and prices have been determined, the mechanism could interleave the questions pertinent to GVA with questions for determining the overall allocation. This way bidders would not know (at least not directly) which purpose the questions are for. The only open issue to deal with is the concern that the questions that the auctioneer asks a bidder leak information to the bidder about the answers that the other bidders have submitted so far. This makes the auction format not entirely sealed-bid. Since the GVA was originally designed for sealed-bid auctions, it is not totally obvious that it leads to an incentive compatible mechanism when used in conjunction with the above described elicitation method.

To compute each bidder's value in a winning allocation in a manner to encourage bidders to bid truthfully, the winning allocation is determined based on bidder's answers to preference elicitations regarding their bids. Next, the values of the bids forming the winning allocation, absent the value of each bid of one bidder, are summed to obtain a first value. Another winning allocation is then determined absent the one bidder. The values of the bids in the other winning allocation are then summed to obtain a second value. A difference is then determined between the first and second values. This difference is the value assigned to the bid(s) of the one bidder in the winning allocation regardless of the one bidder's bid price(s). In other words, the sum of the one bidder's bid price(s) for each of the one bidder's bid(s) included in the winning allocation is ignored in favor of the difference between the between the first and second values. These steps are then repeated for each bidder having a bid in the first winning allocation. Pricing:

Prices can be helpful if information needs to be elicited to determine and establish an efficient allocation. Prices impose a natural limit on over exaggerating announced valuation, because the transfer of money incurred with paying prices imposes the risk to loose money.

The idea behind pricing is the following. If a bundling is known, the most relevant prices are the prices for the bundles that are part of the efficient allocation. If enforcement should be restricted, prices for super-bundles of the bundles in the allocation have to be linear. For example, assume that B1 and B2 are bundles in the efficient allocation and $P_{B1} + P_{B2} < P_{B1}P_{B2}$. A buyer wishing to buy super-bundles B1B2 may want to buy B1 and B2 separately, possibly destroying the efficiency of the allocation. If the price of super-bundle B1B2 is lower than the sum of the bundle prices, buyers interested in the bundles may form a purchasing cartel to buy the super bundle, again possibly destroying the efficiency. All other prices are rather cosmetic and can be set (non-linear) so that the allocation is self-enforcing, that is each agent would accept a distribution of the bundles according to the computed equilibrium. Given a welfare-maximizing allocation X. A price vector is called coherent with an X, if the prices of all super-bundles in X are linear with respect to the prices for bundles in X and if the sum of prices for each set of sub bundles is equal or higher than the price of the union bundle.

A price vector that solves the following algorithm 20 can be utilized to determine an equilibrium price vector. This price vector p supports the optimal allocation.

Algorithm 20: Minimize $\sum_{b \in B_x} p_b$ subject to
$s_i + p_B \geq v_i(B) \forall i, B \in 2^{B_x}$;
$p_B = \sum_{b \in B} p_b \quad \forall B \in 2^{B_x}$;
$\sum_i s_i + \sum_{b \in B_x} p_b = V$; and
$s_i, p_b \geq 0 \forall i, b$.

where X=an efficient allocation of bundles b;
V=the value of the efficient allocation;
$B_x$=set of all bundles in X assigned to buyers; and
$s_i$=the surplus s of buyer i.

The following Algorithm 21 can be used to establish equilibrium prices. If the existence of equilibrium prices is not guaranteed, Algorithm 21 will require an additional termination check.

Algorithm 21: Pricing p (0, . . . , 0).
Compute Y; Compute Δ; Compute J;
while J ≠ ∅ do
  i = arg max$_{j \in J}$ Δ$_j$.
  Pick y arbitrarily from Y$_i$; p$_y$ = p$_y$ + Δ$_i$
  Compute Y; Compute Δ; Compute J;

where p=the price vector containing prices for all goods in Ω';
N=the set of agents;
X=(X$_1$, . . . , X$_n$) is the allocation restricted to buyers; and
Y=(Y$_1$, . . . , Y$_n$) is a vector of subsets Ω'.

In Algorithm 21, for each agent i, Y$_i$ gives the set of most preferred bundles at the going prices. Additionally, in each round, a set J={j∈N:X$_i$∉Y$_i$}, and a vector Δ with Δ$_i$=(u$_i$(y$_i$)−p$_{y_i}$)−(u$_i$(X$_i$)−P$_{x_i}$) for an arbitrarily chosen y$_i$∈Y$_i$ will be computed.

Together with algorithms to determine efficient allocation, the determination of equilibrium price enables two-stage mechanisms to be designed for sealed-bid combinatorial auctions that explore the topological space in which the allocations are embedded and may generate anonymous prices that do not require enforcement.

Conclusion

Combinatorial auctions where bidders can bid on bundles of items can be very desirable market mechanisms when the items sold exhibit complementarity and/or substitutability, so the bidder's valuations for bundles are not additive. However, they require potentially every bundle to be bid on, and there are exponentially many bundles. This is complex for the bidder because of the need to invest effort or computation into determining each valuation. If the bidder evaluates non-winning bundles, evaluation effort is wasted. Bidding on too many bundles can also be undesirable from the perspective of revealing unnecessary private information and from the perspective of causing unnecessary communication overhead. If the bidder omits evaluating (or bidding on) some bundles on which the bidder would have been competitive, economic efficiency and revenue are generally compromised. A bidder could try to evaluate (more accurately) only those bundles on which the bidder would be competitive. However, in general it is difficult to know on which bundle the bidder would be competitive before evaluating the bundles.

The topological structure that is inherent in the foregoing problem can be used to intelligently ask only relevant questions about the bidders' valuations while still finding the optimal (welfare-maximizing and/or Pareto-efficient) solution(s). The rank lattice was disclosed as an analysis tool and a data structure, in the form of augmented order graph G, was disclosed for storing and propagating all of the information that the auctioneer receives. Desirably, the data structure and the storing and propagating of information received by the auctioneer is realized in one or more standalone or networked computers of the type well know in the art. Desirably, the present invention is realized in instructions stored on computer readable medium. When executed, the instructions cause the processor of each of the one or more standalone or networked computers to perform the method of the present invention. However, the present invention can be can also be realized without the use of the one or more standalone or networked computers, albeit less efficiently. Based on received information, the auctioneer can narrow down the set of potentially desirable allocations, and intelligently decide which questions to ask the bidders next.

Three types of elicitation queries were disclosed: value queries (potentially with bounds only), order queries, and rank queries (arbitrarily or in order). Selective interrogation algorithms were disclosed that use different combinations of these to find the desired solution(s). Some of the above-described algorithms focused on the propagation of new information, and would support any interrogation policy. Also disclosed are search-based algorithms that integrate an interrogation policy into the interrogation algorithm in order to use a standard search strategy for interrogation, and in order to not have to use and store the elaborate data structure inherent in policy-independent algorithms.

The invention can also be utilized in connection with ascending, descending or fixed values on items of a bundle. The invention can also be utilized in combination with exchange description data (EDD) of the type disclosed in co-pending U.S. patent application Ser. No.: 10/254,241, filed Sep. 25, 2002, which is expressly incorporated herein by reference, to modify queries of the type disclosed herein and/or to analyze bids in view of the answers to such queries.

Briefly, U.S. patent application Ser. No. 10/254,241 discloses a method of processing an exchange. (A forward auction and a reverse auction are simply special cases of an exchange). The method includes providing a solver/analyzer responsive to at least one bid of an exchange for determining an infeasible allocation, a winning allocation or a feasible allocation for the exchange. Each allocation has an allocation value associated therewith. At least one bid is received at the solver/analyzer with each bid including at least one item and an associated bid price. Exchange description data (EDD) is associated with the at least one bid. EDD includes at least one of the features of reserve price, free disposal, non-price attribute, adjustment, objective, constraint, feasible obtainer, constraint relaxer, conditional pricing and quote request. The associated EDD can be received at the solver/analyzer which processes the at least one bid in accordance with the at least one feature included in the associated EDD.

The non-price attribute feature can include a bid attribute and/or an item attribute. The bid attribute can be credit history, shipping cost, bidder credit worthiness, bidder business location, bidder business size, bidder zip code, bidder reliability, bidder reputation, bidder timeliness, freight terms and conditions, insurance terms and conditions, bidder distance and/or bidder flexibility. The item attribute can be size, color, weight, delivery date, width, heighth, purity, concentration, pH, brand, hue, intensity, saturation, shade, reflectance, origin, destination, volume, earliest pickup time, latest pickup time, earliest drop-off time, latest drop-off time, production facility, packaging and/or flexibility.

The adjustment feature can include an item adjustment or a bid adjustment. The item adjustment includes a value and a condition, wherein the value is utilized to modify the bid price of at least one bid when the condition is satisfied. The item adjustment is based on an item attribute of at least one bid. The item attribute for an item adjustment can be one or more of the item attributes discussed above in connection with the non-price attribute feature.

The condition can be formed utilizing at least one of the following operators associated with a condition: equal to, less than, less than or equal to, greater than, greater than or equal to and contains-item.

The objective feature can establish a maximization goal or a minimization goal for the exchange. The objective feature can also include one of a surplus, a traded ask volume, a traded bid volume, a traded average volume, a number of winning bidders and a number of losing bidders.

The constraint feature can include a cost constraint, a unit constraint a cost requirement, a unit requirement, a counting constraint, a counting requirement, a homogeneity constraint and/or a mixture constraint.

The constraint relaxer feature can cause the solver/analyzer to relax at least one soft constraint placed on an exchange and to determine a value associated with such relaxation. The exchange can also include at least one hard constraint that the solver/analyzer cannot relax.

The conditional pricing feature can include a cost conditional pricing that causes the solver/analyzer to modify a value of an allocation based on a difference between the total awarded currency volume of a first bid group and the total awarded currency volume of a second bid group. Also or alternatively, the conditional pricing feature can include a unit conditional pricing that causes the solver/analyzer to modify a value of an allocation based on a difference between an awarded unit volume of a first bid group and an awarded unit volume of a second bid group.

The reserve price feature can cause the solver analyzer to establish a maximum price above which a bid for an item or bundle of items will not be bought, and/ or establish a minimum price below which a bid for an item or bundle of items will not be sold.

The free disposal feature can cause the solver/analyzer to allocate less than an offered quantity of an item for sale without affecting the bid price or allocate more than an offered quantity of the item for purchase without affecting the bid price.

The quote request feature can cause the solver/analyzer to determine for a bid associated with the quote request a price that would result in the bid being included in an allocation.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A computer implemented method of determining a winning allocation in a forward auction, reverse auction or exchange comprising the following steps implemented by a computer processor operating under the control of a software program tangibly stored on a computer readable medium:

(a) the computer processor defining a plurality of allocations, wherein each allocation defines a trade between one or more potential buyers and one or more potential sellers;

(b) the computer processor querying a bidder regarding at least one preference of said bidder about at least one allocation defined in step (a), a bundle associated with the one allocation defined in step (a), or an item associated with the one allocation defined in step (a), wherein the bidder is either a buyer or a seller;

(c) the computer processor receiving said bidder's reply or intimation to the query of step (b);

19

(d) based on said reply or intimation received in step (c), the computer processor permanently eliminating from consideration as a winning allocation each allocation defined in step (a) that is either (1) not feasible or (2) not optimal;

(e) repeating steps (b)-(d) at least one time, wherein:
  for each repetition of step (b) the same bidder or a different bidder is queried from the previous repetition of step (b); and
  at least one iteration of step (b) includes either (1) a query of at least the bidder's preferred bundle or item that is not in response to a hypothetical bid price being proposed for at least one bundle or item, or (2) a query of at least the bidder's preferred bundle or item that is in response to a hypothetical bid price being proposed for at least two bundles or items, wherein the hypothetical bid price includes a price of at least one of said items or bundles that decreases from a prior query of said bidder's preferred bundle or item in response to a different hypothetical bid price being proposed for at least two bundles or items in a prior iteration of step (b); and (f) based on a predetermined criteria, the computer processor selecting one of the remaining plurality of allocations as the winning allocation.

2. The method of claim 1, wherein the reply in step (c) is at least one of the following: (1) responsive to the query or (2) unsolicited information regarding said at least one preference of said bidder.

3. The method of claim 1, wherein the intimation in step (c) is the absence of a response by said bidder to the query.

4. The method of claim 1, wherein the predetermined criteria of step (f) includes one of the following:
  one remaining allocation;
  all remaining allocations are equally optimal;
  the remaining allocation's values are all within a measure of each other; or
  all remaining allocations have values that are within a predetermined range of values.

5. The method of claim 4, wherein the measure includes a bound or a factor.

6. The method of claim 1, wherein the query in at least one iteration of step (b) includes at least one of the following:
  an upper bound or lower bound on the bidder's desired price for a bundle;
  the bidder's desired ranking of a bundle;
  the bidder's desired order of at least two bundles in the sense the bidder prefers one bundle over another;
  the bidder's desired attribute(s) associated with a bundle or at least one item thereof; or
  how the bidder assimilates attribute(s) in the sense of how his utility is affected by the attribute values.

7. The method of claim 6, wherein the bidder's desired attribute(s) include at least one of the following: credit history, shipping cost, bidder credit worthiness, bidder business location, bidder business size, bidder zip code, bidder reliability, bidder reputation, bidder timeliness, freight terms and conditions, insurance terms and conditions, bidder distance, bidder flexibility, size, color, weight, delivery date, width, height, purity, concentration, pH, brand, hue, intensity, saturation, shade, reflectance, origin, destination, volume, earliest pickup time, latest pickup time, earliest drop-off time, latest drop-off time, production facility, packaging or flexibility.

8. The method of claim 1, wherein the query in at least one iteration of step (b) includes at least one of the following:
  the bidder being asked if a valuation for a bundle is an exact price; or
  the bidder being asked to supply an exact price for the bundle.

9. The method of claim 1, wherein the query in at least one iteration of step (b) includes at least one of the following:
  the bidder being asked to supply a ranking of at least two bundles;
  the bidder being asked to supply a bundle that the bidder desires at a specific ranking;
  the bidder being asked to supply a desired ranking to a bundle X; or
  the bidder being asked to supply a next desired bundle after a bundle X.

10. The method of claim 1, wherein each bundle includes the combination of at least one item, a quantity of said one item and a price for the bundle.

11. The method of claim 1, further including the computer processor performing the following steps under the control of the software program tangibly stored on the computer readable medium:
  the computer processor summing the values of the bundles forming the winning allocation absent the value of each bundle of one bidder to obtain a first value;
  the computer processor determining another winning allocation absent the one bidder;
  the computer processor summing the values of the bundles in the other winning allocation to obtain a second value;
  the computer processor determining a difference between the first and second values; and
  the computer processor assigning said difference as the value of each bundle of the one bidder in the winning allocation regardless of the price assigned to each bundle of the one bidder.

12. The method of claim 11, wherein the difference assigned is the value the bidder pays or the value the bidder receives.

13. The method of claim 1, wherein the query elicits from the bidder information known only by the bidder.

14. The method of claim 1, wherein the query includes at least one of the following:
  the bidder being asked the effect on at least one offer when the allocations are restricted; or
  the bidder being asked what restriction can be applied to the allocations to produce a specific change in at least one offer.

15. The method of claim 1, wherein the query in at least one iteration of step (b) includes the bidder being asked how much of a discount will an offer receive for a minimum value commitment.

16. A computer readable medium having tangibly stored thereon software which, when executed by a computer processor, cause the computer processor to perform the steps of:
  (a) define a plurality of allocations, wherein each allocation defines a trade between one or more potential buyers and one or more potential sellers;
  (b) query a bidder regarding at least one preference of said bidder about at least one allocation defined in step (a), a bundle associated with the one allocation defined in step (a), or an item associated with the one allocation defined in step (a), wherein the bidder is either a buyer or a seller;
  (c) receive said bidder's reply or intimation to the query of step (b);
  (d) based on said reply or intimation received in step (c), permanently eliminating from consideration as a winning allocation each allocation defined in step (a) that is either (1) not feasible or (2) not optimal;

(e) repeat steps (b)-(d) at least one time, wherein:
    for each repetition of step (b) the same bidder or a different bidder is queried from the previous repetition of step (b); and
    at least one iteration of step (b) includes either (1) a query of at least the bidder's preferred bundle or item that is not in response to a hypothetical bid price being proposed for at least one bundle or item, or (2) a query of at least the bidder's preferred bundle or item that is in response to a hypothetical bid price being proposed for at least two bundles or items, wherein the hypothetical bid price includes a price of at least one of said items or bundles that decreases from a prior query of said bidder's preferred bundle or item in response to a different hypothetical bid price being proposed for at least two bundles or items in a prior iteration of step (b); and
(f) based on a predetermined criteria, select one of the remaining allocations as the winning allocation.

17. The computer readable medium of claim 16, wherein the reply in step (c) is either (1) responsive to the query or (2) unsolicited information regarding said at least one preference of said bidder.

18. The computer readable medium of claim 16, wherein the intimation in step (c) is the absence of a response by said bidder to the query.

19. The computer readable medium of claim 16, wherein the predetermined criteria includes one of the following:
    one remaining allocation;
    all remaining allocations are equally optimal;
    the remaining allocation's values are all within a measure of each other; or
    all remaining allocations have values that are within a predetermined range of values.

20. The computer readable medium of claim 19, wherein the measure includes a bound or factor.

21. The computer readable medium of claim 16, wherein the query in at least one iteration of step (b) includes at least one of the following:
    an upper bound or lower bound on the bidder's desired price for a bundle;
    the bidder's desired ranking of a bundle;
    the bidder's desired order of at least two bundles in the sense the bidder prefers one bundle over another;
    the bidder's desired attribute(s) associated with a bundle or at least one item thereof; or
    how the bidder assimilates attribute(s) in the sense of how his utility is affected by the attribute values.

22. The computer readable medium of claim 21, wherein the bidder's desired attribute(s) include at least one of the following: credit history, shipping cost, bidder credit worthiness, bidder business location, bidder business size, bidder zip code, bidder reliability, bidder reputation, bidder timeliness, freight terms and conditions, insurance terms and conditions, bidder distance, bidder flexibility, size, color, weight, delivery date, width, height, purity, concentration, pH, brand, hue, intensity, saturation, shade, reflectance, origin, destination, volume, earliest pickup time, latest pickup time, earliest drop-off time, latest drop-off time, production facility, packaging or flexibility.

23. The computer readable medium of claim 16, wherein the query in at least one iteration of step (b) includes at least one of the following:
    the bidder being asked if a valuation for a bundle is an exact price; or
    the bidder being asked to supply an exact price for the bundle.

24. The computer readable medium of claim 16, wherein the query in at least one iteration of step (b) includes at least one of the following:
    the bidder being asked to supply a ranking of at least two bundles;
    the bidder being asked to supply a bundle that the bidder desires at a specific ranking;
    the bidder being asked to supply a desired ranking to a bundle X; or
    the bidder being asked to supply a next desired bundle after a bundle X.

25. The computer readable medium of claim 16, wherein each bundle includes the combination of a least one item, a quantity of said one item and a price for the bundle.

26. The computer readable medium of claim 16, wherein the software further causes the computer processor to:
    sum the values of the bundles forming the winning allocation absent the value of each bundle of one bidder to obtain a first value;
    determine another winning allocation absent the one bidder;
    sum the values of the bundles in the other winning allocation to obtain a second value;
    determine a difference between the first and second values; and
    assign said difference as the value of each bundle of the one bidder in the winning allocation regardless of the price assigned to each bundle of the one bidder.

27. The computer readable medium of claim 26, wherein the difference assigned is the value the bidder pays or the value the bidder receives.

28. The computer readable medium of claim 16, wherein the query elicits from the bidder information known only by the bidder.

29. The computer readable medium of claim 16, wherein the query includes at least one of the following:
    the bidder being asked the effect on at least one offer when the allocations are restricted; or
    the bidder being asked what restriction can be applied to the allocations to produce a specific change in at least one offer.

30. The computer readable medium of claim 16, wherein the query in at least one iteration of step (b) includes the bidder being asked how much of a discount will an offer receive for a minimum value commitment.

* * * * *